Dec. 15, 1931.  L. X. CHAMPEAU  1,837,147
FLOODLIGHT
Filed June 3, 1929  2 Sheets-Sheet 1
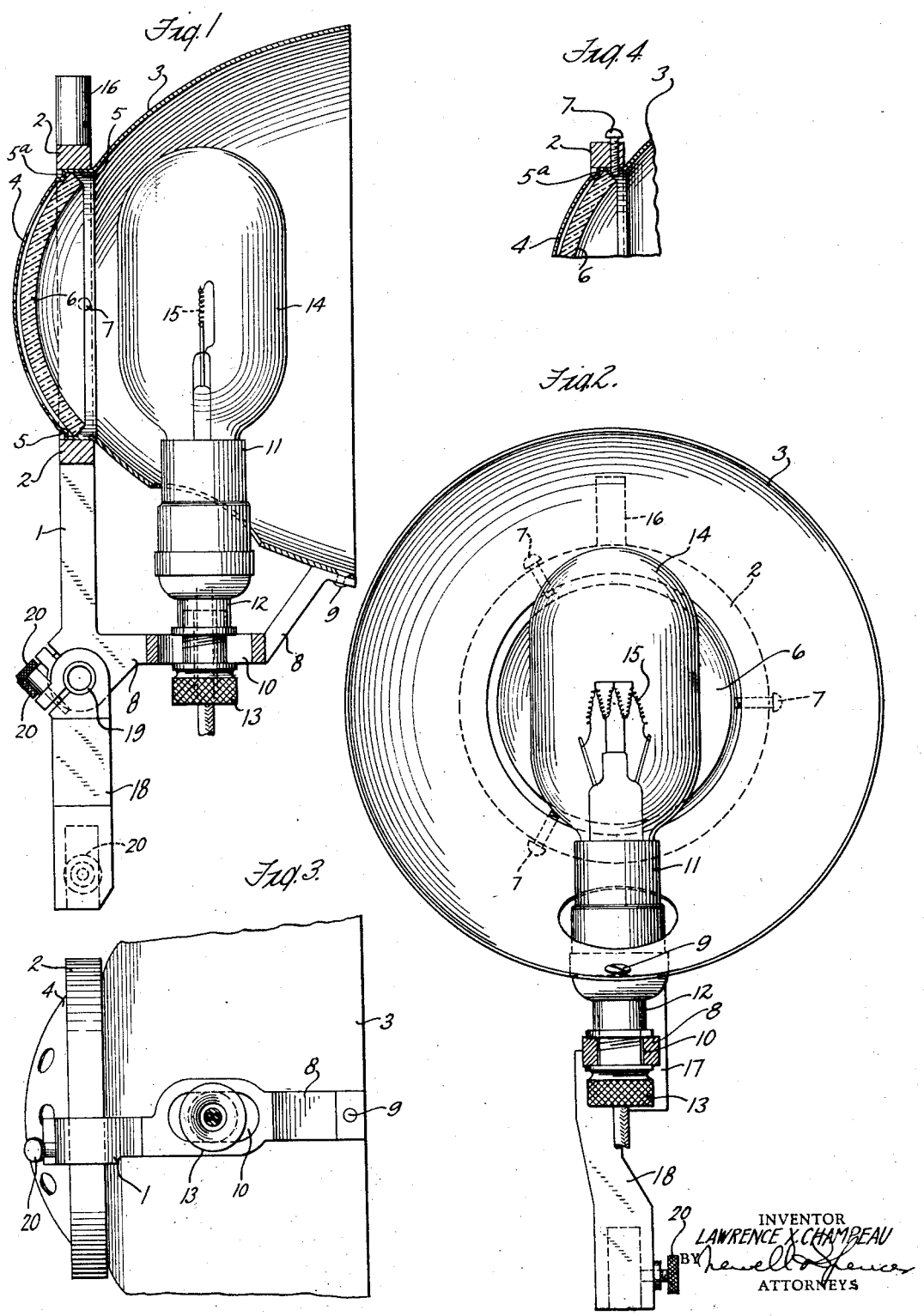

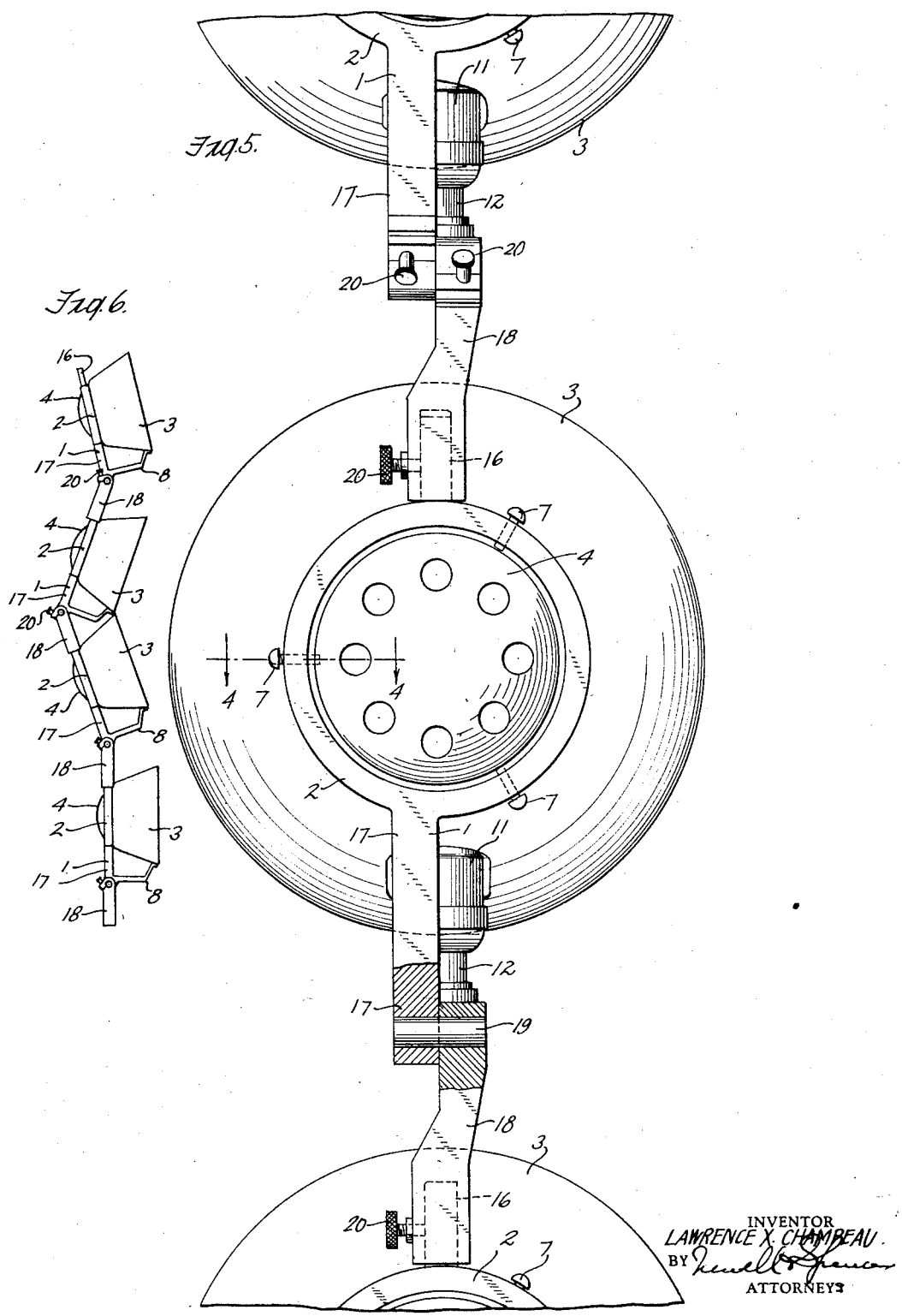

Patented Dec. 15, 1931

1,837,147

UNITED STATES PATENT OFFICE

LAWRENCE X. CHAMPEAU, OF NEW YORK, N. Y.

FLOODLIGHT

Application filed June 3, 1929. Serial No. 367,898.

This invention relates to flood lights such as are used for moving picture work and for other photographic purposes, although the invention is not limited to this field.

An object of the invention is to produce a light of this character which shall be free from the objections existing in lights now in use, which gives a very even illumination over a flat field and which may be constructed at a very reasonable cost.

A further object of the invention relates to the mounting of the light whereby it may be readily adjusted and whereby a plurality of lights may be adjusted to meet different requirements of illumination.

In flood lights with which I am familiar the reflecting surface extends over the whole area of the reflector and it is not economically possible to make these polished surfaces sufficiently optically accurate to give even illumination to the object to be photographed. The result is a series of rings which show up in the photographs. On the other hand, if reflectors of this sort are not highly polished, but are merely light-diffusing surfaces, such a large percentage of the light is lost that the efficiency as a whole is very much reduced.

My invention overcomes these disadvantages and provides at reasonable cost a light having high efficiency.

In the preferred form of my invention my flood light consists of a light source placed at the center of curvature of a relatively small spherical mirror, which mirror, due to its small size, may be accurately ground at reasonable cost. Combined with this is a hood which may be made of aluminum or other material and the inner surface of which is not sufficiently polished to constitute a reflecting surface in the optical sense, but which surface is finished so as to give what might be termed a diffused reflecting surface.

In order that the combination of mirror and hood may give a substantially even illumination over a flat surface I prefer to form the hood in such a way that the light reflected from it covers the same field as the light reflected from the mirror but tending to give greater intensity at the outer edges, and since the light reflected from the mirror and the light directly coming from the source of illumination tends to throw a stronger light at the center, the combination gives a nearly uniform light on a flat field.

Other features and advantages will become apparent from the following description and claims when considered in connection with the accompanying drawings in which—

Figure 1 is a view partly in section and partly in side elevation of my improved flood light construction;

Figure 2 is a front elevation;

Figure 3 a view looking upward;

Figure 4 a section on line 4—4 of Figure 5;

Figure 5 a back view showing the mounting arrangement for several lights; and

Figure 6 a side view of several lights turned at different angles.

Referring to the drawings, 1 indicates a bracket having a ring portion 2 shown in Figure 5 and in dotted lines in Figure 2.

3 is a flared hood having formed integral therewith a socket 4 of spherical shape. The hood also has a cylindrical portion 5 fitting the inner surface of the ring and also has bent-out ring portions 5a with which a reflector 6 engages. The ring 2 carries screws 7 which engage the reflector as indicated in Figure 4, for holding it in place. The bracket 1 also has a lower arm 8 suitably shaped for supporting the hood at its outer edge, as, for instance, by a screw 9, Figure 1. The arm 8 is slotted for the reception of a source of light, this consisting of an electric bulb having a socket 11, the lower portion of which is screw-threaded at 12 and a thumb screw 13 engages the threads for adjustably securing the light in the bracket. The bulb of the light is shown at 14 and the filament or source of light at 15.

The inner surface of the flared hood is not intended to be light-reflecting in the sense of having a polished surface, but is provided rather with a light-diffusing surface.

The mirror 6 is preferably made of glass and its two parallel surfaces are accurately ground and the back surface is silvered. The mirror in effect forms a portion of a spherical shell. The source of light is situated substantially at the center of curvature of the spherical surface of the mirror so that the result is a reflection along the radius of curvature of all light falling upon the mirror.

The flare of the hood is such that no reflected light from the mirror falls upon the inner surface of the hood, this surface acting as a diffusing surface, and is so shaped that the light directly falling upon it from the source of light 15 tends to be thrown toward the outer edges of the field covered by the light itself and the reflection from the mirror.

We thus have three overlapping sources of light, covering the same field, one direct from the light 15, the other two indirect— i. e. reflection from the mirror and diffused reflection from the inner surface of the hood. When projected on a flat field the center of the field is somewhat more intensively illuminated than are the edges, in so far as light coming from the light source and from the mirror are concerned. On the other hand, by forming the inner surface of the hood so that the diffused reflection from said surface tends to be greater at the edges of the field than at the center thereof, the whole field is more evenly illuminated than is possible with reflectors now available.

The mirror itself is relatively small compared with the entire structure and therefore can be ground optically perfect and produce the same optical effect as if the entire surface of the hood, including that portion occupied by the mirror, were likewise optically perfectly ground.

In the use of flood lights it frequently happens that the object to be illumined requires different illumination for different parts and a number of lights are frequently employed. It is very desirable that these lights may be conveniently adjusted to give different degrees of illumination to different portions of the area illuminated. To do this in a convenient and economical manner, I have provided a very efficient form of bracket which can be duplicated to any extent and any number of lights may be used together and adjusted to suit varying conditions.

To this end, the bracket 1 is formed with an upper pivotal portion 16 projecting from the ring 2. Projecting in the opposite direction is a portion 17 which carries a bearing for a pivot at right angles to the pivot 16. Each bracket is made exactly alike and for the purpose of connecting one bracket to another, I provide a rigid member 18, one end of which has a pivotal bearing matching the pivotal bearing in the arm 17 and the other end of which has a bearing which fits the pivot 16. Adjusting screws 20 provide means for holding the parts of the bracket in the desired position. In Figure 6 I have shown four lights differently positioned to illustrate the way in which the brackets may be used to direct the light as desired.

Having thus described my invention, what I desire to secure by United States Letters Patent and claim is:

1. A flood light comprising a bracket of ring shape, a flared hood having a socket fitting the interior of the ring, a spherical mirror situated in the socket, and means carried by the ring for holding the mirror in place.

2. A flood light comprising a hood having an inner light-diffusing surface, a socket integral with the hood, said socket having a spherical portion and a circular portion, a bracket of ring shape engaging the circular portion of the socket, and a mirror seated in the socket and secured in place by means carried by the ring.

3. A flood light comprising a bracket including a ring-shaped portion, an arm extending from the ring forming a pivot, a second arm extending from the ring and forming a bearing for a pivot at right angles to the first-mentioned pivot, and a rigid member having one end formed with a bearing matching the bearing on said second arm and its other end having a bearing fitting the pivot on the first arm.

Signed at New York, New York, this 27th day of May, 1929.

LAWRENCE X. CHAMPEAU.